US012615207B2

(12) United States Patent
Ding et al.

(10) Patent No.: US 12,615,207 B2
(45) Date of Patent: Apr. 28, 2026

(54) PACKET TRANSMISSION METHOD AND APPARATUS

(71) Applicant: Huawei Technologies Co., Ltd., Shenzhen (CN)

(72) Inventors: Xiangfeng Ding, Beijing (CN); Haibo Wang, Beijing (CN); Lei Li, Beijing (CN); Lili Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 416 days.

(21) Appl. No.: 18/187,437

(22) Filed: Mar. 21, 2023

(65) Prior Publication Data

US 2023/0224245 A1 Jul. 13, 2023

Related U.S. Application Data

(63) Continuation of application No. PCT/CN2020/117003, filed on Sep. 23, 2020.

(51) Int. Cl.
H04L 45/00 (2022.01)
H04L 45/02 (2022.01)

(52) U.S. Cl.
CPC ............ H04L 45/566 (2013.01); H04L 45/04 (2013.01); H04L 45/38 (2013.01)

(58) Field of Classification Search
CPC ....... H04L 45/566; H04L 45/64; H04L 45/02; H04L 45/04; H04L 45/24; H04L 45/38; H04L 45/033; H04L 45/50; H04L 45/74; H04L 47/10; H04L 47/24
See application file for complete search history.

(56) References Cited

U.S. PATENT DOCUMENTS

| | | | |
|---|---|---|---|
| 2006/0245374 A1 | 11/2006 | Patel et al. | |
| 2008/0101385 A1 | 5/2008 | Elias et al. | |
| 2010/0110928 A1* | 5/2010 | Elias ..................... | H04L 45/02 |
| | | | 370/254 |
| 2021/0184974 A1 | 6/2021 | Wu et al. | |
| 2021/0297340 A1* | 9/2021 | Saad ................... | H04L 12/4633 |

(Continued)

FOREIGN PATENT DOCUMENTS

| | | |
|---|---|---|
| CN | 101155175 A | 4/2008 |
| CN | 102611632 A | 7/2012 |

(Continued)

OTHER PUBLICATIONS

S. Sangli et al, "BGP Extended Communities Attribute," RFC 4360, Feb. 2006, 12 pages.

(Continued)

*Primary Examiner* — Mohamed A Kamara
(74) *Attorney, Agent, or Firm* — Conley Rose, P.C.

(57) ABSTRACT

A packet transmission method includes, obtaining one or more control items, a first network device determines, based on a fact that a device identifier included in a first packet to which each control item belongs is a device identifier of a second network device, a target control item to be sent to the second network device. The first network device sends at least one second packet comprising the target control item to the second network device, where the target control item is located in the at least one second packet, and the second packet includes the device identifier of the second network device.

14 Claims, 7 Drawing Sheets

(56)  References Cited

U.S. PATENT DOCUMENTS

| | | | | |
|---|---|---|---|---|
| 2021/0352013 A1* | 11/2021 | Devaraj | ................ | H04L 45/02 |
| 2022/0417153 A1* | 12/2022 | Wu | ...................... | H04L 45/033 |

FOREIGN PATENT DOCUMENTS

| | | | | | |
|---|---|---|---|---|---|
| CN | 104753794 A | | 7/2015 | | |
| CN | 106059922 A | | 10/2016 | | |
| CN | 106254252 A | * | 12/2016 | ............ | H04L 45/02 |
| CN | 113438159 A | | 9/2021 | | |
| EP | 1875666 A2 | | 1/2008 | | |
| EP | 3306874 A1 | | 4/2018 | | |
| WO | 2006118704 A2 | | 11/2006 | | |
| WO | 2020043107 A1 | | 3/2020 | | |

OTHER PUBLICATIONS

W. Wang et al, "Route Distinguisher Outbound Route Filter (RD-ORF) for BGP-4," draft-wang-idr-rd-orf-03, IDR Working Group, Internet-Draft, Aug. 24, 2020, 14 pages.

* cited by examiner

R0

R1                                    R2

R0          Level-1 RR

R1          Level-2 RR          R2

R3          R4          R5          R6

Ingress node
201

Transit node
202

Egress node
203

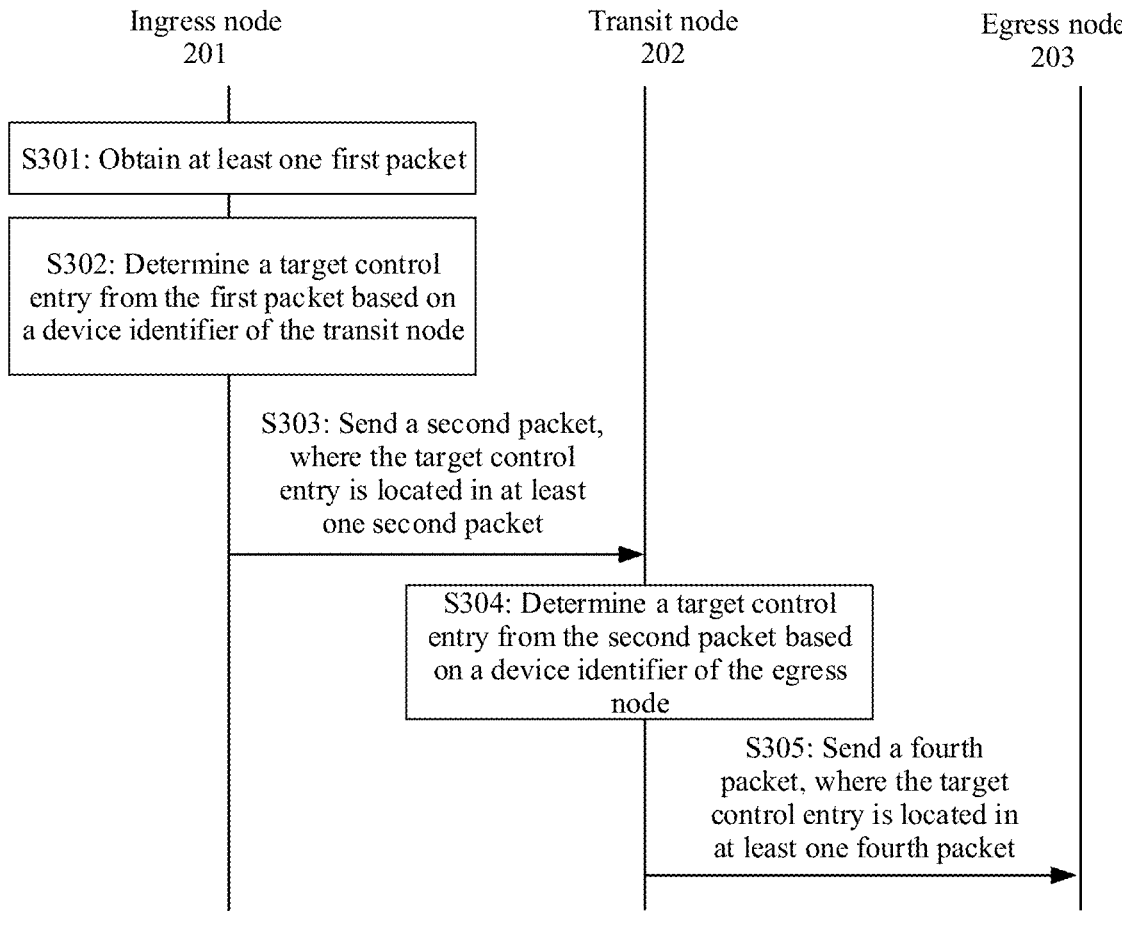

S301: Obtain at least one first packet

S302: Determine a target control
entry from the first packet based on
a device identifier of the transit node S303: Send a second packet,
where the target control
entry is located in at least
one second packet S304: Determine a target control
entry from the second packet based
on a device identifier of the egress
node S305: Send a fourth
packet, where the target
control entry is located in
at least one fourth packet

FIG. 3

Update packet

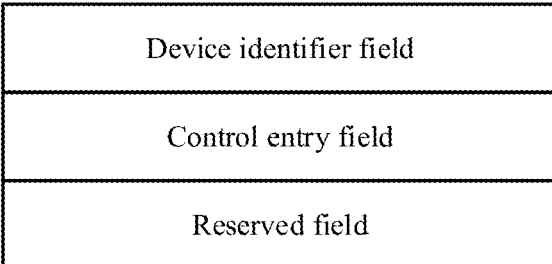

| Device identifier field |
| --- |
| Control entry field |
| Reserved field |

FIG. 4A

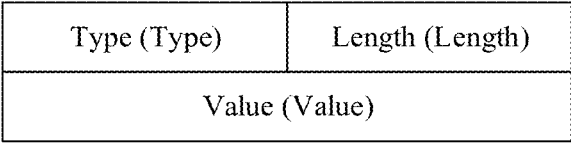

| Type (Type) | Length (Length) |
|---|---|
| Value (Value) | |

FIG. 4B

First network
device

Second network
device

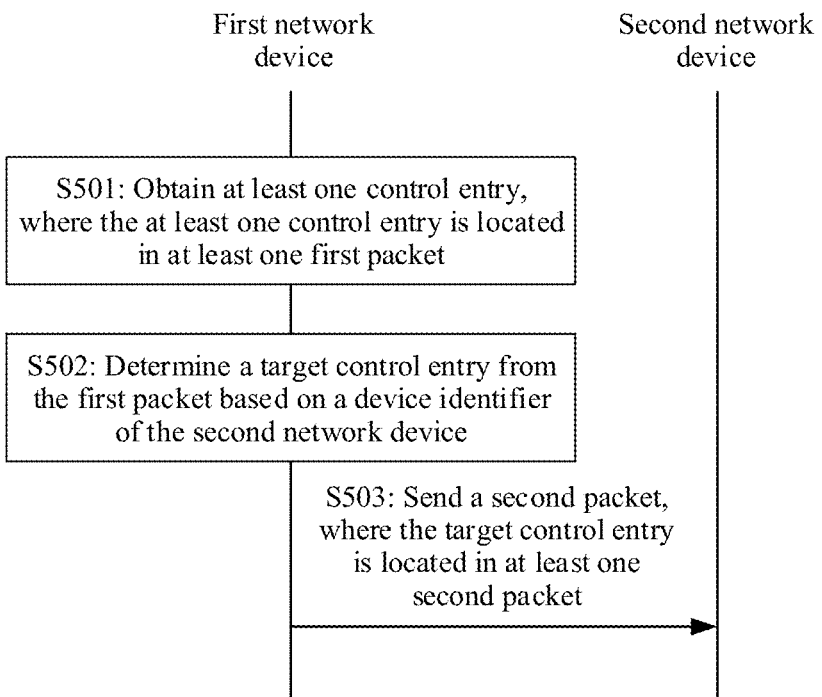

S501: Obtain at least one control entry,
where the at least one control entry is located
in at least one first packet S502: Determine a target control entry from
the first packet based on a device identifier
of the second network device S503: Send a second packet,
where the target control entry
is located in at least one
second packet

FIG. 5

PACKET TRANSMISSION METHOD AND APPARATUS

CROSS-REFERENCE TO RELATED APPLICATIONS

This application is a continuation of International Patent Application No. PCT/CN2020/117003 filed on Sep. 23, 2020, the disclosure of which is hereby incorporated by reference in its entirety.

TECHNICAL FIELD

The present disclosure relates to the field of communications technologies, and specifically, to a packet transmission method and apparatus.

BACKGROUND

In a data transmission process, to ensure connectivity between internal Border Gateway Protocol (IBGP) peers, a full mesh needs to be established between the IBGP peers. As shown in FIG. 1A, an autonomous system (AS) includes four routers. The four routers may form IBGP peers( ). To ensure connectivity between the routers, six IBGP connections need to be established. When an AS includes a relatively large quantity of routers, a relatively large quantity of IBGP connections need to be established. Consequently, large quantities of network resources and controller resources are consumed. To resolve the above problems, a route reflection solution is proposed. In an embodiment, in an AS, one router is used as a route reflector (RR), the other routers are used as clients to separately establish IBGP connections to the RR, and no IBGP connection needs to be established between the clients( ). The RR transmits (or reflects) routing information to each client. As shown in FIG. 1B, R0 is used as an RR to establish an IBGP connection to each of R1, R2, and R3. R1, R2, and R3 are used as clients of the RR.

However, during service deployment, although the RR sends all obtained routing information to each client, each client actually needs to process routing information related to a service requirement of only the client, and discards other routing information that is not related to the service requirement. Therefore, each client needs to be configured with a route filtering policy that fits the client to help the client filter unnecessary routing information according to the configured route filtering policy. When there are hundreds of clients, an amount of routing information reflected by an RR increases exponentially, higher requirements on a device processing capability of the RR are imposed, and network congestion is aggravated; in addition, the workload of configuring route filtering policies on the clients increases greatly, and different clients usually need to be configured with different route filtering policies, resulting in difficult maintenance.

SUMMARY

In view of this, embodiments of the present disclosure provide a packet transmission method and apparatus, to reduce an amount of routing information reflected by an RR, reduce network congestion, and simplify service deployment.

To resolve the foregoing problem, the embodiments of the present disclosure provide the following technical solutions.

According to a first aspect, a packet transmission method is provided. The method includes: A first network device obtains at least one control item, where the at least one control item is located in at least one first packet, and the at least one first packet each includes a device identifier of a network device to which the first packet needs to be sent; the first network device determines, based on a fact that a device identifier included in a part or all of the at least one first packet is a device identifier of a second network device, a target control item to be sent to the second network device, where the target control item is one or more of the at least one control item; and the first network device sends at least one second packet to the second network device, where the target control item is located in the at least one second packet, and the at least one second packet each includes the device identifier of the second network device. In this embodiment, before obtaining one or more control items and sending the control items to the second network device, the first network device may determine, based on a fact that a device identifier in a first packet in which the control items are located is a device identifier of the second network device, a target control item to be sent to the second network device, and then send one or more second packets including the target control item to the second network device. In this way, the second network device obtains only the control item required by the second network device. Therefore, pressure on the first network device to advertise the control item is reduced, and network congestion is reduced. In addition, no filtering policy needs to be deployed on the second network device, thereby simplifying service deployment.

In a possible implementation, the first network device is a route reflection device.

In a possible implementation, the second network device is a route reflection device, or the second network device is a client device. In this implementation, when a level-1 route reflection device exists in an application scenario, the first network device is a route reflection device, and the second network device is a client device. When a level-2 route reflection device exists in the application scenario, the first network device is a level-1 route reflection device, and the second network device is a level-2 route reflection device.

In a possible implementation, when the second network device is the route reflection device, the at least one second packet further includes a device identifier of a third network device. The device identifier of the third network device is used to indicate the second network device to determine, from the target control item based on the device identifier of the third network device, a control item to be sent to the third network device. In this implementation, when the second network device is the level-2 route reflection device, a client corresponding to the second network device may exist, that is, the third network device. In this case, the second packet may further include the device identifier of the third network device. The second network device may determine, based on a fact that a device identifier in the second packet is the identifier of the third network device, a target control item to be sent to the third network device. In this way, the second network device may send, to the third network device, only the target control item required by the third network device.

In a possible implementation, when a third network device corresponding to the second network device exists, the second network device may receive a fifth packet sent by the third network device. The fifth packet includes a device identifier of the third network device. The second network device may determine, based on a fact that the device identifier of the third network device in the fifth packet matches a device identifier of the third network device in one or more second packets to which the target control item belongs, and from the matched second packet, the target control item to be sent to the third network device.

In a possible implementation, the at least one second packet is a border gateway protocol BGP packet, and the device identifier of the second network device is separately located in an extended community attribute of the at least one second packet. In this implementation, a device identifier included in the first packet or the second packet may be located in an extended community attribute of the packet. The first network device may determine, by parsing an extended community attribute in the first packet, whether a device identifier included in the first packet is a device identifier of the second network device.

In a possible implementation, the device identifier of the second network device is a router identifier Router-ID. In this implementation, the device identifier of the second network device may be a router identifier. The router identifier may be specifically an IP address or a loopback address of the second network device.

In a possible implementation, the method further includes: Before the first network device obtains the at least one control item, the first network device receives a third packet sent by the second network device. The third packet includes a device identifier of the second network device. That the first network device determines, based on a fact that a device identifier included in a part or all of the at least one first packet is a device identifier of a second network device, a target control item to be sent to the second network device includes: Based on a fact that the device identifier of the second network device received from the third packet matches the device identifier of the second network device in one or more first packets to which the target control item belongs, the first network device determines, from the one or more first packets, the target control item to be sent to the second network device. In this implementation, the second network device sends the third packet including the device identifier of the second network device to the first network device in advance, so that the first network device can learn of the device identifier of the second network device. When determining the target control item to be sent to the second network device, the first network device may determine, based on a fact that the device identifier of the second network device obtained from the third packet matches the device identifier of the second network device in the first packet, the target control item from the matched first packet.

In a possible implementation, the control item is a flow specification (flowspec), a segment routing (SR) policy, or a route policy distribution (RPD).

In a possible implementation, the at least one control item is obtained by the first network device from a controller or a server, or the at least one control item is received by the first network device from a fourth network device, or the at least one control item is locally configured by the first network device. In this implementation, when the first network device is an ingress node, the first network device may obtain a control item from a controller or a server, or the control item is locally configured. When the first network device is a transit node or an egress node, the first network device may receive a control item sent by an upper-level network device.

In a possible implementation, when the at least one control item is received by the first network device from the fourth network device, the at least one control item is determined by the fourth network device based on a device identifier of the first network device. When the first network device is the transit node or the egress node, the upper-level network device may determine, based on the device identifier of the first network device, a target control item to be sent to the first network device, and then send the target control item required by the first network device to the first network device.

According to a second aspect of the embodiments of the present disclosure, a packet transmission system is provided. The system includes a first network device and a second network device. The first network device is configured to obtain at least one control item, the at least one control item is located in at least one first packet, and the at least one first packet each includes a device identifier of a network device to which the first packet needs to be sent. The first network device is further configured to determine, based on a fact that a device identifier included in a part or all of the at least one first packet is a device identifier of the second network device, a target control item to be sent to the second network device, and the target control item is one or more of the at least one control item. The first network device is further configured to send at least one second packet to the second network device, the target control item is located in the at least one second packet, and the at least one second packet each includes the device identifier of the second network device. The second network device is configured to receive the at least one second packet.

In a possible implementation, the system further includes a third network device, and the at least one second packet further includes a device identifier of the third network device. The second network device is further configured to determine, from the target control item based on the device identifier of the third network device, a control item to be sent to the third network device, and the control item is at least one or more control items in the target control item. The second network device is further configured to send at least one fourth packet to the third network device, the control item is located in the at least one fourth packet, and the at least one fourth packet each includes the device identifier of the third network device.

In a possible implementation, the second network device is further configured to send a third packet to the first network device, and the third packet includes the device identifier of the second network device.

In a possible implementation, the third network device is further configured to send a fifth packet to the second network device, and the fifth packet includes the device identifier of the third network device.

According to a third aspect of the embodiments of the present disclosure, a packet transmission apparatus is provided. The apparatus includes: an obtaining unit configured to obtain at least one control item, where the at least one control item is located in at least one first packet, and the at least one first packet each includes a device identifier of a network device to which the first packet needs to be sent; a determining unit configured to determine, based on a fact that a device identifier included in a part or all of the at least one first packet is a device identifier of a second network device, a target control item to be sent to the second network device, where the target control item is one or more of the at least one control item; and a sending unit configured to send at least one second packet to the second network device, where the target control item is located in the at least one second packet, and the at least one second packet each includes the device identifier of the second network device.

In a possible implementation, the apparatus is a route reflection device.

In a possible implementation, the second network device is a route reflection device, or the second network device is a client device.

In a possible implementation, when the second network device is the route reflection device, the at least one second packet further includes a device identifier of a third network device. The device identifier of the third network device is used to indicate the second network device to determine, from the target control item based on the device identifier of the third network device, a control item to be sent to the third network device.

In a possible implementation, the at least one second packet is a border gateway protocol BGP packet, and the device identifier of the second network device is separately located in an extended community attribute of the at least one second packet.

In a possible implementation, the device identifier of the second network device is a router identifier Router-ID.

In a possible implementation, the apparatus further includes a receiving unit. The receiving unit is further configured to: before the obtaining unit is executed, receive a third packet sent by the second network device, and the third packet includes a device identifier of the second network device. The determining unit is further configured to determine, based on a fact that the device identifier of the second network device received from the third packet matches the device identifier of the second network device in one or more first packets to which the target control item belongs, and from the one or more first packets, the target control item to be sent to the second network device.

In a possible implementation, the control item is a flow-spec, a SR policy, or an RPD.

In a possible implementation, the at least one control item is obtained by the apparatus from a controller or a server, or the at least one control item is received by the apparatus from a fourth network device, or the at least one control item is locally configured by the first network device.

In a possible implementation, when the at least one control item is received by the apparatus from the fourth network device, the at least one control item is determined by the fourth network device based on a device identifier of the apparatus.

According to a fourth aspect of the embodiments of the present disclosure, a communications device is provided, including a processor and a memory. The memory is configured to store computer-readable instructions or a computer program. The processor is configured to read the computer-readable instructions or the computer program, to enable the communications device to implement the packet transmission method according to the first aspect.

According to a fifth aspect of the embodiments of the present disclosure, a computer-readable storage medium includes instructions or a computer program. When the instructions or the computer program is run on a computer, the computer is enabled to perform the packet transmission method according to the first aspect.

According to the technical solutions provided in the embodiments of the present disclosure, after obtaining one or more control items, the first network device determines, based on a fact that a device identifier included in a first packet to which each control item belongs is the device identifier of the second network device, a target control item to be sent to the second network device. The target control item is used to indicate the second network device to perform local control, and the target control item is one or more of the obtained at least one control item. The first network device sends at least one second packet to the second network device, where the target control item is located in the at least one second packet, and the second packet includes the device identifier of the second network device. It can be learned that, according to the packet transmission method provided in the embodiments of the present disclosure, when forwarding a control item to the second network device, the first network device may obtain, through matching based on the device identifier of the second network device, the target control item required by the second network device, and then send only the target control item to the second network device. This reduces pressure on the first network device to advertise the control item, and reduces network congestion. In addition, no filtering policy needs to be deployed on the second network device, thereby simplifying service deployment.

BRIEF DESCRIPTION OF DRAWINGS

To describe the technical solutions in the specific implementations of the present disclosure or in the conventional technology more clearly, the following briefly describes the accompanying drawings for describing the specific implementations or the conventional technology. It is clear that the accompanying drawings in the following description show some specific implementations of the present disclosure, and a person of ordinary skill in the art may still derive other drawings from these accompanying drawings without creative efforts.

FIG. 3 is a flowchart of packet transmission according to an embodiment of the present disclosure;

FIG. 4A is a schematic diagram of a structure of an UPDATE packet according to an embodiment of the present disclosure;

FIG. 4B is a schematic diagram of a device identifier according to an embodiment of the present disclosure;

FIG. 5 is a flowchart of another packet transmission according to an embodiment of the present disclosure;

DESCRIPTION OF EMBODIMENTS

To make a person skilled in the art understand the technical solutions in the present disclosure better, the following clearly describes the technical solutions in the embodiments of the present disclosure with reference to the accompanying drawings in the embodiments of the present disclosure. It is clear that the described embodiments are merely some rather than all of the embodiments of the present disclosure. All the embodiments based on the present disclosure shall fall within the protection scope of the present disclosure.

Figure 1A:
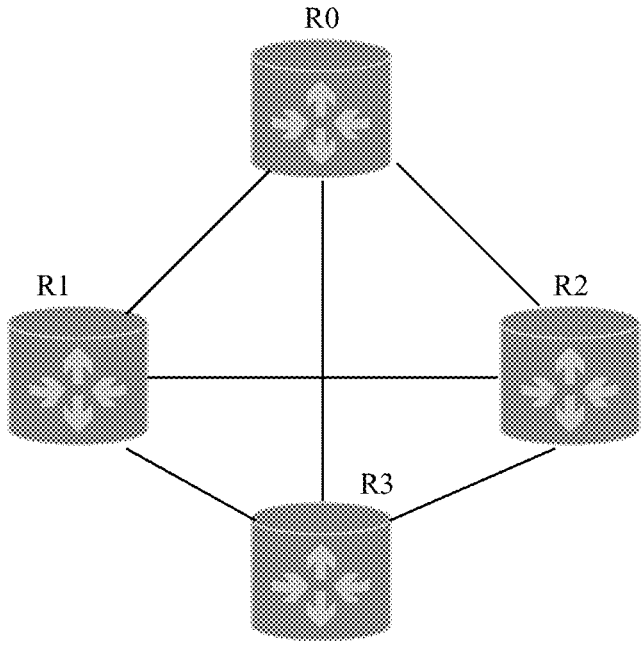
FIG. 1A is a schematic diagram of a full mesh in a BGP network architecture.
Figure 1B:
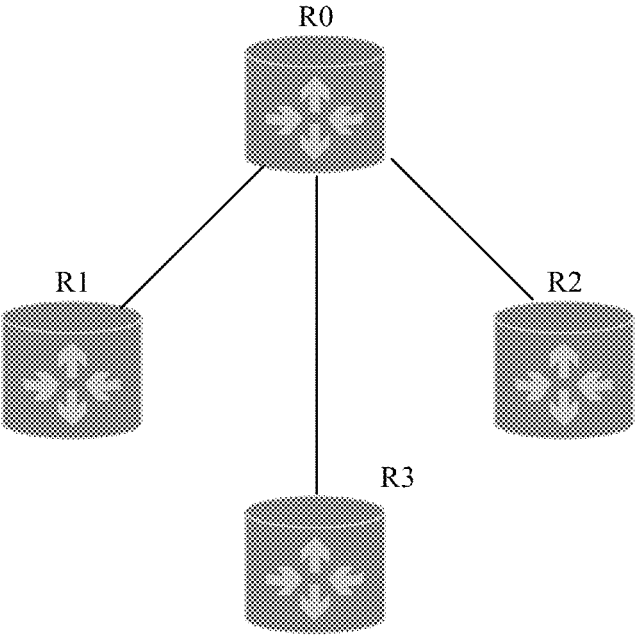
FIG. 1B is a schematic diagram of route reflection in a BGP network architecture.
Figure 2A:
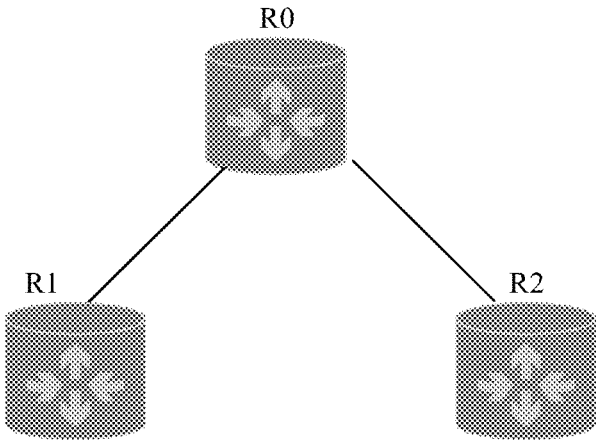
FIG. 2A is a schematic diagram of an application scenario according to an embodiment of the present disclosure.
Figure 2B:
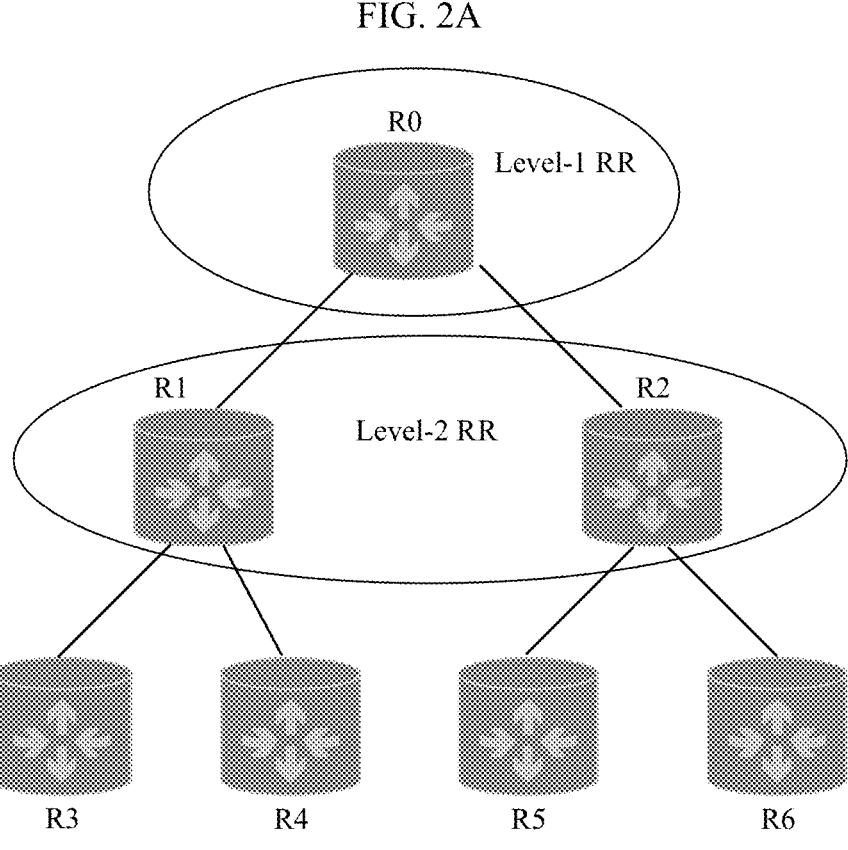
FIG. 2B is a schematic diagram of another application scenario according to an embodiment of the present disclosure.

Referring to a schematic diagram of an application scenario shown in FIG. 2A, an example in which a network system includes a level-1 route reflection device is used for description. In an embodiment, a network device R0 is a route reflection device, and a network device R1 and a network device R2 are used as clients corresponding to the route reflection device R0. For another example, FIG. 2B is a schematic diagram of another application scenario, and an example in which a network system includes two levels of route reflection devices is used for description. In an embodiment, a network device R0 is used as a level-1 route reflection device, and a network device R1 and a network device R2 are used as level-2 route reflection devices. Lower-level network devices connected to the level-1 route reflection device R0 are the network device R1 and the network device R2 that play RR roles. R0, R1, and R2 are network devices with an RR reflection function. In addition, R1 and R2 relative to R0 may also be referred to as clients of R0. Because the level-2 route reflection devices R1 and R2 are both used as the clients of the level-1 route reflection device R0, there is no need to establish a full mesh between the network device R1 and the network device R2. Lower-level network devices connected to the level-2 route reflection device R1 are network devices R3 and R4 that play client roles, and lower-level network devices connected to the level-2 route reflection device R2 are network devices R5 and R6 that play client roles. R3 to R6 are used as clients to receive routes or policies reflected by RRs, but do not have a route reflection function. In a possible case, R3 and R4 are peers, and R5 and R6 are peers.

Each network device may also be referred to as a node, and is a device that has a packet forwarding function in a network system, for example, may be a router, a switch, a forwarder, a label switching router (LSR), or the like. In the application scenario shown in FIG. 2A, there are two transmission paths: R0→R1 and R0→R2. R0 is an ingress node, and R1 or R2 is an egress node. In the application scenario shown in FIG. 2B, there are a plurality of transmission paths: R0→R1→R3, R0→R1→R4, R0→R2→R5, and R0→R2→R6. In this embodiment, R0 is an ingress node 201, R1 and R2 are transit nodes 202, and R3, R4, R5, and R6 are egress nodes.

In one case, an ingress node may be a node that generates a first packet, that is, a node indicated by a source address in the first packet. In this case, the ingress node is the first node on an end-to-end transmission path of the packet. In another case, an ingress node may be a node connected to a server or a controller, and may obtain a first packet from the server or the controller.

In one case, an egress node may be a node indicated by a destination address in a first packet. In another case, an egress node is a node connected to a node indicated by a destination address. In another case, an egress node may be the last node that is on an end-to-end transmission path and that needs to perform local control based on a control item in a first packet.

A transit node is one or more forwarding nodes that a packet passes through between an ingress node and an egress node during forwarding.

For ease of understanding, the following uses a network system structure shown in FIG. 2B as an example for description. FIG. 3 is a flowchart of a packet transmission method according to an embodiment of the present disclosure. Named roles such as an ingress node 201, a transit node 202, and an egress node 203 in the following embodiments are mainly used to distinguish different functions that can be performed by different network devices on a packet forwarding path. Locations of the different network devices in a network topology may be specifically determined with reference to different service scenarios. As shown in FIG. 3, the method may include the following steps.

S301: The ingress node 201 obtains at least one first packet.

In this embodiment, the ingress node 201 first obtains the at least one first packet including one or more control items. To be specific, the ingress node 201 may obtain one or more first packets, and each first packet may include one or more control items. Each first packet includes a device identifier of a network device to which the first packet needs to be sent. The device identifier of the network device may be a router identifier (router-id) that may be an Internet Protocol (IP) address or a loopback loopback address of the network device, or the device identifier is an identity (identification, ID) of the network device, or the like. For example, FIG. 2B is still used as an example. The ingress node 201 is the network device R0. Transit nodes 202 are the network device R1 and the network device R2. A router identifier of the network device R1 is 1.1.1.1, and a router identifier of the network device R2 is 2.2.2.2. If the first packet includes the route identifier 1.1.1.1, it indicates that the one or more control items in the first packet are to be sent to the network device R1. If the first packet includes the route identifier 2.2.2.2, it indicates that the one or more control items in the first packet may be sent to the network device R2. The control item is used to indicate a network device receiving the control item to perform local control. The control item may be a flowspec, an SR policy, an RPD, or the like.

In the foregoing example, the ingress node 201 is R0 in FIG. 2B. In another possible case, the ingress node may alternatively be R1 or R2 in FIG. 2B.

The ingress node 201 obtains the at least one first packet in the following manners. In one manner, the ingress node 201 may obtain the at least one first packet from a controller or a server connected to the ingress node 201, that is, the controller or the server generates the at least one first packet, and a first network device may receive the at least one first packet sent by the controller or the server. In another manner, the ingress node 201 obtains the at least one first packet that is locally configured. In an embodiment, the ingress node 201 may obtain the at least one first packet from local configuration information, and the local configuration information may be, for example, manually configured by a user in the ingress node 201 according to an actual service requirement.

The first packet may be a Border Gateway Protocol (BGP) packet. In an embodiment, the first packet may be an update (UPDATE) packet in a BGP packet, and the update packet includes at least a device identifier field and a control item field. FIG. 4A is a schematic diagram of a structure of an update packet. The update packet may include not only a device identifier field and a control item field, but also a reserved field. The reserved field may carry another attribute field. In some possible cases, the another attribute field may be used to perform refined filtering on the control item. For example, the ingress node 201 determines, by jointly using a device identifier field and another attribute field, a first packet that needs to be sent to a device and that includes a plurality of control items. A device identifier included in the device identifier field of the determined first packet matches a device identifier concerned by the ingress node 201, and an attribute included in the another attribute field of the determined first packet matches an attribute concerned by the ingress node 201. The device identifier included in the first packet may be located in an extended community attribute of the first packet, and the device identifier is indicated by using a type-length-value (TLV) in the extended community attribute. As shown in FIG. 4B, a type field is used to indicate an extended community attribute type, a length field is used to indicate a quantity of bytes included in a "value" field, for example, 8 bytes, and the value field is used to indicate a device identifier. In a possible implementation, when the extended community attribute in the first packet is an IP address-based extended community attribute, the value field includes a global administrator information field, and the global administrator information field carries a device identifier. When the first packet includes a plurality of device identifiers, the value field may include a plurality of global administrator information fields, and each global administrator information field carries one device identifier.

The foregoing carrying manner is merely used as a possible example. In another possible application scenario or design manner, one or more device identifiers carried in the first packet may alternatively be located in another possible type of packet, or may be located in another possible field of the packet. Even different device identifiers may be located in different types of fields, provided that the device identifiers can be identified and understood by a device on a side receiving the first packet, so that the device on the receiving side can perform matching by using corresponding device identifiers to determine a target control item that needs to be forwarded.

S302: The ingress node 201 determines, based on a fact that a device identifier included in a part or all of the at least one first packet is a device identifier of the transit node 202, a target control item to be sent to the transit node 202.

When the ingress node 201 sends a control item to the transit node 202, to ensure that the sent control item is a control item required by the transit node 202 and reduce sending pressure of the ingress node 201, the ingress node 201 may determine, based on a fact that the device identifier included in a part or all of the at least one first packet is the device identifier of the transit node 202, the target control item to be sent to the transit node 202. That is, the ingress node 201 determines, from a control item included in each obtained first packet, the target control item to be sent to the transit node 202. A first packet to which the target control item belongs includes the device identifier of the transit node 202. For example, the device identifier of the transit node 202 is 1.1.1.1, the ingress node 201 obtains 100 first packets, and device identifiers included in 20 first packets are 1.1.1.1. In this case, the ingress node 201 may determine all control items included in 20 first packets as target control items. The transit node 202 may be R1 or R2 in FIG. 2B.

During actual application, the ingress node 201 may receive a third packet sent by the transit node 202. The third packet includes a device identifier of the transit node 202. In this way, the transit node 202 notifies the ingress node 201 of the device identifier corresponding to the transit node 202 by using the third packet. The ingress node 201 may determine, based on a fact that the device identifier of the transit node 202 received from the third packet matches a device identifier of the transit node 202 included in a first packet, and from the matched first packet, the target control item to be sent to the transit node 202, and further obtain a second packet based on the target control item. In a case, the third packet may further include another attribute field. In this case, when determining the target control item to be sent to the transit node 202, the ingress node 201 may determine, based on a fact that the device identifier of the transit node 202 and another attribute that are received from the third packet match a device identifier of the transit node 202 and an attribute field that are included in a first packet, and from the matched first packet, the target control item to be sent to the transit node 202. That is, when determining the matched first packet based on the device identifier of the transit node 202, the ingress node 201 may determine all control items included in the matched first packet as target control items. Alternatively, after determining the matched first packet based on the device identifier of the transit node 202, the ingress node 201 may further determine, from the matched first packet based on the another attribute, a first packet that meets the another attribute, and determine a control item included in the first packet that meets the another attribute as a target control item. The target control item may include one or more control items that may be distributed in one first packet or a plurality of first packets. For example, the ingress node 201 determines 20 matched first packets from 100 obtained first packets based on the device identifier of the transit node 202, then determines, from 20 first packets based on the another attribute, a total of five first packets including the another attribute, and determines control items in the five first packets as target control items.

After determining the target control item based on the at least one first packet, the ingress node 201 obtains at least one second packet based on the target control item. The at least one second packet is a packet that is determined by the ingress node 201 and that is used to carry the target control item. A manner of obtaining the at least one second packet includes at least the following several cases.

In one case, the ingress node 201 may use, as the second packet, the first packet obtained through matching by using the device identifier of the transit node 202. That is, all control items in each first packet obtained through matching are determined as target control items. For example, the ingress node 201 obtains a total of 50 first packets, where 20 first packets include the device identifier of the transit node 202. In this case, 20 first packets are matched first packets. The ingress node 201 uses the matched first packets as second packets. In this way, 20 second packets are determined.

In another case, the ingress node 201 first determines, based on the device identifier of the transit node 202 and a fact that a device identifier included in a part or all of first packets is the device identifier of the transit node 202, a control item in the part or all of the first packets obtained through matching based on the device identifier of the transit node 202 as the target control item to be sent to the transit node 202, and re-encapsulates the target control item to obtain at least one second packet. For example, the ingress node 201 determines 50 target control items from one first packet (including 100 control items) based on the device identifier of the transit node 202, and the ingress node 201 re-encapsulates 50 target control items to obtain at least one second packet.

In still another case, the ingress node 201 first determines, based on the device identifier of the transit node 202 and a fact that a device identifier included in a part or all of first packets is the device identifier of the transit node 202, the target control item to be sent to the transit node 202. Then, the ingress node 201 generates at least one second packet based on the target control item and a control item that needs to be sent to the transit node 202 and that is locally stored before the at least one first packet is obtained.

S303: The ingress node 201 sends the at least one second packet to the transit node 202.

After determining, based on the device identifier of the transit node 202, the target control item to be sent to the transit node 202, the ingress node 201 may obtain the at least one second packet based on the target control item, and send the at least one second packet to the transit node 202. The target control item determined by the ingress node 201 by using S302 may be located in the at least one second packet, and each second packet includes the device identifier of the transit node 202. The second packet may be a border gateway protocol BGP packet, and the device identifier included in the second packet may be located in an extended community attribute of the second packet. A specific representation form may be defined by adding a type-length-value TLV to the extended community attribute, as shown in FIG. 4B. For a format of the second packet and an encapsulation format of the device identifier in the second packet, refer to the related descriptions of the first packet in S301.

S304: The transit node 202 determines, based on a fact that a device identifier included in a part or all of the at least one second packet is a device identifier of the egress node 203, a target control item to be sent to the egress node 203.

In this embodiment, after receiving the at least one second packet sent by the ingress node 201, the transit node 202 may determine, based on a fact that a part or all of the at least one second packet includes a device identifier of the egress node 203, the target control item to be sent to the egress node 203. The second packet sent by the ingress node 201 to the transit node 202 may further include the device identifier of the egress node 203. For example, if the device identifier of the transit node 202 is 1.1.1.1, and the device identifier of the egress node 203 is 3.3.3.3, the second packet sent by the ingress node 201 may include not only the device identifier 1.1.1.1, but also the device identifier 3.3.3.3. The device identifier 1.1.1.1 is used to indicate that the at least one second packet is a packet to be sent to the transit node 202, and the transit node 202 may receive and store the at least one second packet. The device identifier 3.3.3.3 may be used to indicate the transit node 202 to determine, from the at least one second packet based on the device identifier, a target control item that needs to be sent to the egress node 203, where the egress node 203 is a network device whose device identifier is 3.3.3.3. For example, as shown in FIG. 2B, when the transit node 202 is R1, the egress node 203 may be R3 or R4, or when the transit node 202 is R2, the egress node 203 may be R5 or R6. In a possible implementation, in addition to the device identifier 1.1.1.1, the first packet obtained by the ingress node 201 further includes the device identifier 3.3.3.3. In this way, when the ingress node 201 sends the at least second packet including the target control item to the transit node 202, the device identifier 3.3.3.3 is also carried.

During actual application, before the transit node 202 determines the target control item to be sent to the egress node 203, the transit node 202 may receive a fifth packet sent by the egress node 203. The fifth packet includes a device identifier of the egress node 203. In this way, the egress node 203 notifies the transit node 202 of the device identifier corresponding to the egress node 203 by using the fifth packet. Therefore, when the transit node 202 receives the at least one second packet from the ingress node 201, the transit node 202 may determine, based on a fact that the device identifier of the egress node 203 received from the fifth packet matches a device identifier of the egress node 203 included in second packet, and from the matched second packet, the target control item to be sent to the egress node 203, and further obtain at least one fourth packet including the target control item to be sent to the egress node 203. In a case, the fifth packet may further include another attribute field. In this case, when determining a target control item to be sent to the egress node 203, the transit node 202 may determine, based on a fact that the device identifier of the egress node 203 and another attribute that are received from the fifth packet respectively match a device identifier of the egress node 203 and an attribute field that are included in a second packet, and from the matched second packet, the target control item to be sent to the egress node 203. For specific implementation in which the transit node 202 determines to send the target control item to the egress node 203 and obtains the fourth packet based on the target control item, refer to the related descriptions in the second packet obtaining manner in S302.

S305: The transit node 202 sends the at least one fourth packet to the egress node 203.

After determining, based on the device identifier of the egress node 203, the target control item to be sent to the egress node 203, the transit node 202 generates the at least one fourth packet based on the target control item, and sends the at least one fourth packet to the egress node 203. The target control item determined by the transit node 202 by using S304 may be located in the at least one fourth packet, and each fourth packet includes a device identifier of the egress node 203. The fourth packet may be a border gateway protocol BGP packet. For a format of the fourth packet and an encapsulation format of the device identifier of the egress node 203 in the fourth packet, refer to the related descriptions of the first packet in S301.

In this embodiment, after receiving the fourth packet, the egress node 203 may perform different processing in different application scenarios. In an embodiment, the following operations may be included.

In one case, the egress node 203 does not forward the fourth packet after receiving the fourth packet. For example, when the egress node 203 is a network device connected to user equipment. In this case, the egress node 203 may receive only the fourth packet, and perform local control based on the target control item in the fourth packet. For example, when the target control item is a flow specification, the egress node 203 may select a path based on the flow specification, to adjust a service traffic transmission path. Alternatively, when the target control item is a segment routing policy, the egress node 203 may obtain a segment list of a specified path according to the segment routing policy, to forward subsequently received service traffic by using the segment list. Alternatively, when the target control item is a route policy distribution, the egress node may change routing processing behavior of the egress node based on the route policy distribution. In the foregoing case, the egress node 203 may not forward the fourth packet.

In another case, when a peer node of the egress node 203 exists, the egress node 203 may forward the fourth packet to the peer node when receiving the fourth packet sent by the transit node 202. The peer node may determine a required control item from the fourth packet according to a local policy. It may be understood that the foregoing case is merely used as an example, and a processing operation performed by the egress node 203 on a packet may be determined with reference to a specific application scenario.

In this embodiment, the network system shown in FIG. 2B is used as an example for description. When an actual application scenario is the network system architecture shown in FIG. 2A, after the ingress node obtains at least one first packet, the ingress node determines, based on a fact that a device identifier included in a part or all of the at least one first packet is a device identifier of the egress node, a target control item to be sent to the egress node, and send at least one second packet to the egress node. The target control item is located in the at least one second packet, and the second packet includes a device identifier of the egress node. That is, when there is no intermediate forwarding node between the ingress node and the egress node, the ingress node directly determines, based on the device identifier of the egress node, the target control item to be sent to the egress node. For specific implementation, refer to the related descriptions in S301 to S305. Alternatively, in a possible case, the transit node 202 may not support a route filtering function. In this case, the transit node 202 may not perform S304 and S305, but directly send, to the egress node 203, at least one second packet received from the ingress node 201. Then, the egress node 203 determines a control item required by the egress node 203 according to a local policy. Alternatively, the method provided in this embodiment may also be applied to a possible network system architecture. For example, the network system includes more than three levels of RRs, and each level of RR may determine, by using a corresponding method that can be provided in this embodiment, a route that needs to be sent to a lower-level network device. The lower-level network device may be, for example, an RR having a route reflection function, or may be a client without a route reflection function.

For ease of understanding the technical solutions provided in the embodiments of the present disclosure, refer to FIG. 5. FIG. 5 is a flowchart of another packet transmission method according to an embodiment of the present disclosure. As shown in FIG. 5, the method may include the following steps.

S501: A first network device obtains at least one control item. The at least one control item is located in at least one first packet.

In this embodiment, the first network device may be the ingress node 201 or the transit node 202 described in the foregoing embodiment.

When the first network device is the ingress node 201, the first network device may obtain at least one control item. In an embodiment, the first network device may obtain the at least one control item based on local configuration information, or obtain the at least one control item from a controller or a server. For specific implementation in which the first network device obtains the at least one control item, refer to S301.

When the first network device is the transit node 202, the first network device determines at least one control item from a packet received from a fourth network device serving as an upper-level network device. In a possible case, the upper-level network device may be, for example, the ingress node 201. In an embodiment, the fourth network device may determine, from a packet obtained by the fourth network device based on a device identifier of the first network device, at least one control item to be sent to the first network device, and send the at least one control item to the first network device. The first network device may be a route reflection device. For specific implementation in which the fourth network device determines, based on the device identifier of the first network device, the at least one control item to be sent to the first network device, refer to S302 or S304.

Each first packet includes a device identifier of a network device to which the first packet needs to be sent, and the device identifier may be a router identifier. The control item may be a flowspec, an SR policy, an RPD, or the like. For a format of the first packet and an encapsulation format of the device identifier, refer to S301.

S502: The first network device determines, based on a fact that a device identifier included in a part or all of the at least one first packet is a device identifier of a second network device, a target control item to be sent to the second network device.

In this embodiment, the first network device may determine that a device identifier included in a part or all of the obtained at least one first packet is a device identifier of the second network device, to determine the target control item to be sent to the second network device. In a specific implementation, before the first network device determines the target control item to be sent to the second network device, the first network device may receive a third packet sent by the second network device, where the third packet includes a device identifier of the second network device. The first network device determines, based on a fact that the device identifier of the second network device received from the third packet matches the device identifier of the second network device in one or more first packets to which the target control item belongs, from the one or more first packets, the target control item to be sent to the second network device. For specific implementation in which the first network device determines the target control item to be sent to the second network device, refer to S302 or S304.

S503: The first network device sends at least one second packet to the second network device, where the target control item is located in the at least one second packet.

After determining the target control item to be sent to the second network device, the first network device may obtain at least one second packet based on the target control item, to send the at least one second packet to the second network device. Each second packet includes a device identifier of the second network device, and the device identifier of the second network device is a Router-ID. For specific implementation in which the first network device obtains the at least one second packet, refer to S302.

In a specific implementation, the second packet may be a BGP packet, and the device identifier of the second network device may be located in an extended community attribute of the second packet. In an embodiment, the second packet may be an UPDATE packet in the BGP packet. For a format of the UPDATE packet and an encapsulation format of the device identifier, refer to the related descriptions in S301.

In a specific implementation, the first network device may be a route reflection device, and in this case, the second network device may be a client device, such as R1 or R2 shown in FIG. 2A. Alternatively, the second network device is a lower-level route reflection device, such as R1 or R2 in FIG. 2B. When the second network device is a route reflection device, a client device (a third network device) corresponding to the second network device may exist, for example, R3 and R4, or R5 and R6 in FIG. 2B. In this case, the at least one second packet further includes a device identifier of the third network device. The device identifier of the third network device is used to indicate the second network device to determine, from the target control item based on the device identifier of the third network device, a control item to be sent to the third network device. For implementation in which the second network device determines the control item to be sent to the third network device, refer to S302 or S304.

When the third network device corresponding to the second network device exists, before the second network device determines the target control item to be sent to the third network device, the second network device may receive a fifth packet sent by the third network device. The fifth packet includes a device identifier of the third network device. The second network device determines, based on a fact that the device identifier of the third network device received from the fifth packet matches the device identifier of the third network device in the second packet, and from one or more second packets, a target control item to be sent to the third network device. For specific implementation, refer to S304.

In an embodiment, when the second network device is an egress node, such as R3, R4, R5, or R6 in FIG. 2B, for a specific operation after the second network device receives the second packet, refer to the related descriptions in S305. Details are not described herein again in this embodiment.

Figure 6:
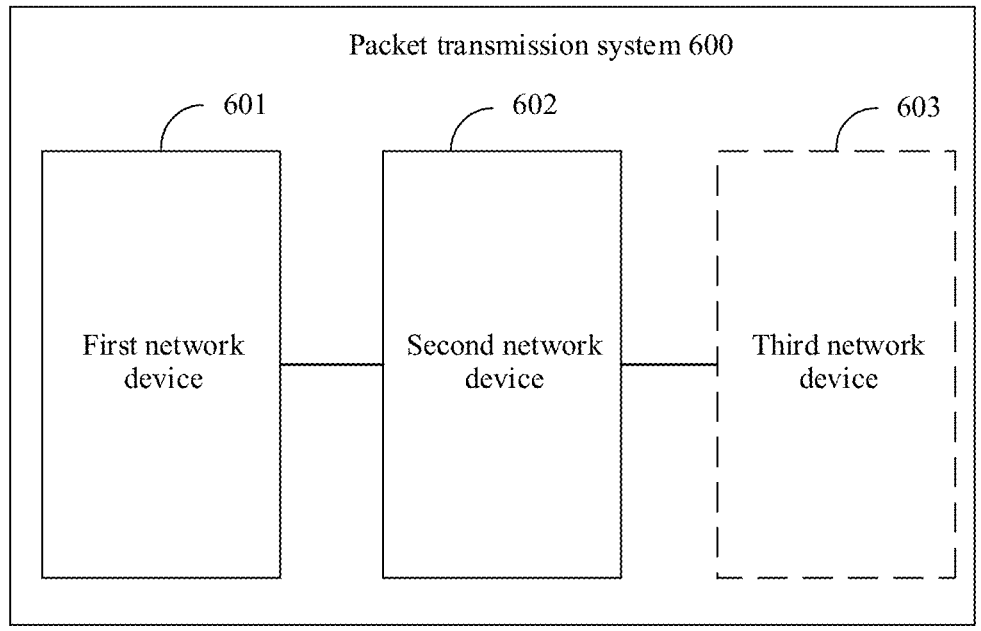
FIG. 6 is a structural diagram of a packet transmission system according to an embodiment of the present disclosure.

Based on the foregoing method embodiments, an embodiment of the present disclosure further provides a packet transmission system. Refer to a structural diagram of a packet transmission system shown in FIG. 6. The system may include a first network device 601 and a second network device 602.

The first network device 601 is configured to obtain at least one control item, the at least one control item is located in at least one first packet, and the at least one first packet each includes a device identifier of a network device to which the first packet needs to be sent. For implementation of the first network device, refer to S301 or S501.

The first network device 601 is further configured to determine, based on a fact that a device identifier included in a part or all of the at least one first packet is a device identifier of the second network device, a target control item to be sent to the second network device, and the target control item is one or more of the at least one control item. For implementation of the first network device, refer to S302, S304, or S502.

The first network device 601 is further configured to send at least one second packet to the second network device, the target control item is located in the at least one second packet, and the at least one second packet each includes the device identifier of the second network device. For specific implementation of the first network device, refer to S303, S305, or S503.

The second network device 602 is configured to receive the at least one second packet.

In a possible implementation, the system further includes a third network device 603, and the at least one second packet further includes a device identifier of the third network device. The second network device 602 is further configured to determine, from the target control item based on the device identifier of the third network device, a control item to be sent to the third network device, and the control item is at least one or more control items in the target control item. For implementation of the third network device 603, refer to S304 or S503.

The second network device 602 is further configured to send at least one fourth packet to the third network device, the control item is located in the at least one fourth packet, and the at least one fourth packet each includes the device identifier of the third network device. For implementation of the second network device 602, refer to S305 or S503.

In a possible implementation, the second network device 602 is further configured to send a third packet to the first network device, and the third packet includes the device identifier of the second network device. For implementation of the second network device 602, refer to S302 or S502.

In a possible implementation, the third network device 603 is further configured to send a fifth packet to the second network device, and the fifth packet includes the device identifier of the third network device. For implementation of the third network device 603, refer to S304 or S503.

In addition, an embodiment of the present disclosure further provides a packet transmission apparatus. The following describes the apparatus with reference to accompanying drawings.

Figure 7:
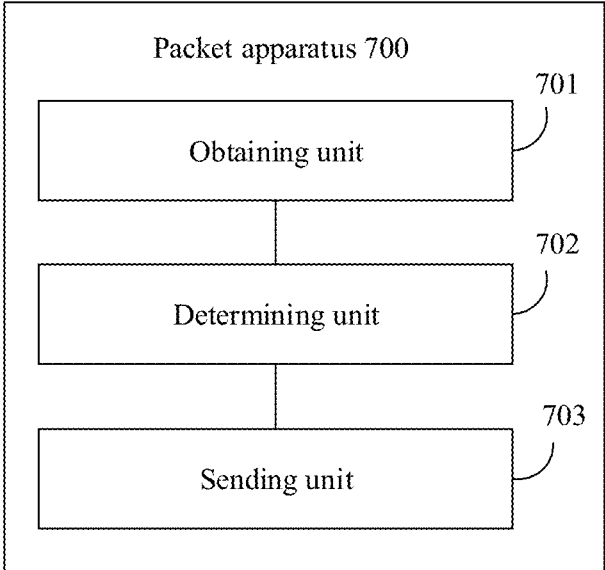
FIG. 7 is a structural diagram of a packet transmission apparatus according to an embodiment of the present disclosure.

FIG. 7 is a schematic diagram of a structure of a packet transmission apparatus according to an embodiment of the present disclosure. The apparatus can be applied to a first network device to perform the functions of the first network device in the embodiment shown in FIG. 5. The apparatus 700 may include an obtaining unit 701, a determining unit 702, and a sending unit 703.

The obtaining unit 701 is configured to obtain at least one control item, where the at least one control item is located in at least one first packet, and the at least one first packet each includes a device identifier of a network device to which the first packet needs to be sent.

When the first network device to which the apparatus 700 is applied is the ingress node 201, for specific implementation in which the obtaining unit 701 obtains the control item, refer to S301 in the embodiment shown in FIG. 3. When the first network device to which the apparatus 700 is applied is the transit node 202 or the egress node 203, for specific implementation in which the obtaining unit 701 obtains the control item, refer to S303 or S305.

The determining unit 702 is configured to determine, based on a fact that a device identifier included in a part or all of the at least one first packet is a device identifier of a second network device, a target control item to be sent to the second network device, and the target control item is one or more of the at least one control item.

For specific implementation of the determining unit 702, refer to S302 or S304.

The sending unit 703 is configured to send at least one second packet to the second network device. The target control item is located in the at least one second packet, and the at least one second packet each includes the device identifier of the second network device.

For specific implementation of the sending unit 703, refer to S303 or S305.

In a possible implementation, the apparatus is a route reflection device. The first network device to which the apparatus 700 is applied may be a route reflection device, for example, the ingress node 201 or the transit node 202.

In a possible implementation, the second network device is a route reflection device, or the second network device is a client device.

When the first network device to which the apparatus 700 is applied is a route reflection device, the second network device may be a route reflection device. For example, the first network device is the ingress node 201, and the second network device is the transit node 202. Alternatively, the second network device is a client device, for example, the first network device is the transit node 202, and the second network device is the egress node 203.

In a possible implementation, when the second network device is the route reflection device, the at least one second packet further includes a device identifier of a third network device; and the device identifier of the third network device is used to indicate the second network device to determine, from the target control item based on the device identifier of the third network device, a control item to be sent to the third network device.

In a possible implementation, the at least one second packet is a BGP packet, and the device identifier of the second network device is separately located in an extended community attribute of the at least one second packet. For a format of a BGP protocol packet and an encapsulation format of a device identifier, refer to S301.

In a possible implementation, the device identifier of the second network device is a router identifier.

In a possible implementation, the apparatus further includes a receiving unit (not shown in FIG. 7).

The receiving unit is further configured to: before the obtaining unit is executed, receive a third packet sent by the second network device, and the third packet includes a device identifier of the second network device. The determining unit is further configured to determine, based on a fact that the device identifier of the second network device received from the third packet matches the device identifier of the second network device in one or more first packets to which the target control item belongs, and from the one or more first packets, the target control item to be sent to the second network device.

For specific implementation of the receiving unit and the determining unit, refer to S302.

In a possible implementation, the control item is a flow-spec, an SR policy, or an RPD.

In a possible implementation, the at least one control item is obtained by the apparatus from a controller or a server, or the at least one control item is received by the apparatus from a fourth network device, or the at least one control item is locally configured by the first network device. For specific implementation of obtaining the control item, refer to S301.

In a possible implementation, when the at least one control item is received by the apparatus from the fourth network device, the at least one control item is determined by the fourth network device based on a device identifier of the apparatus. For implementation in which the network device to which the apparatus 700 is applied receives the control item from the fourth network device, refer to S301.

For specific executable functions and implementation of the packet transmission apparatus 700, refer to the corresponding descriptions about the first network device in the embodiment shown in FIG. 5. Details are not described herein again.

Figure 8:
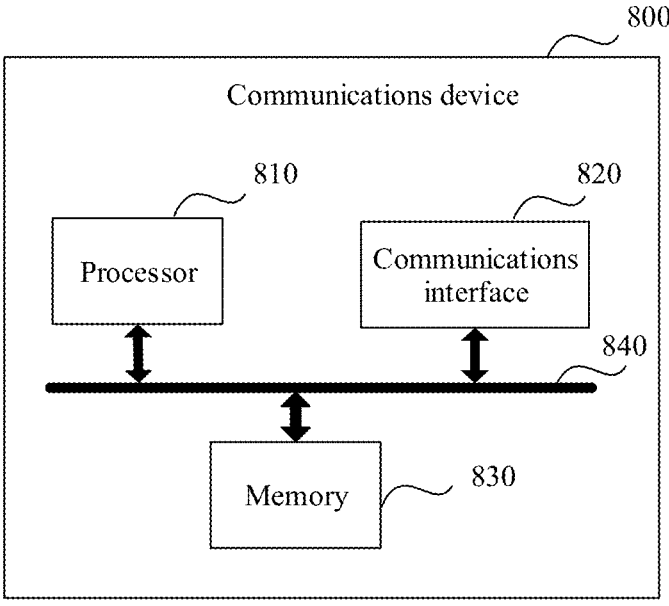
FIG. 8 is a structural diagram of a communications device according to an embodiment of the present disclosure.

FIG. 8 is a schematic diagram of a structure of a communications device according to an embodiment of the present disclosure. The communications device may be, for example, the ingress node 201, the transit node 202, or the egress node 203 in the embodiment shown in FIG. 3, or may be the first network device, the second network device, or the third network device in the embodiment shown in FIG. 5, or may be device implementation of the packet transmission apparatus 700 in the embodiment shown in FIG. 7.

Referring to FIG. 8, the communications device 800 includes at least a processor 810. The communications device 800 may further include a communications interface 820 and a memory 830. There may be one or more processors 810 in the communications device 800, and FIG. 8 shows one processor as an example. In this embodiment of the present disclosure, the processor 810, the communications interface 820, and the memory 830 may be connected by using a bus system or in another manner, and are connected through a bus system 840 as an example in FIG. 8.

The processor 810 may be a central processing unit (CPU), a network processor (NP), or a combination of a CPU and an NP. The processor 810 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

When the communications device includes the ingress node 201, the processor 810 may perform related functions of obtaining the at least one control item, determining the target control item, and the like in the foregoing method embodiments. When the communications device is the transit node 202 or the egress node 203, the processor 810 may perform related functions of determining the target control item based on the device identifier in the foregoing method embodiments.

The communications interface 820 is configured to receive and send a packet. In an embodiment, the communications interface 820 may include a receiving interface and a sending interface. The receiving interface may be configured to receive a packet, and the sending interface may be configured to send a packet. There may be one or more communications interfaces 820.

The memory 830 may include a volatile memory, for example, a random-access memory (RAM). The memory 830 may alternatively include a non-volatile memory, for example, a flash memory, a hard disk drive (HDD), or a solid-state drive (SSD). The memory 830 may alternatively include a combination of the foregoing types of memories. The memory 830 may store, for example, the foregoing correspondence between the identification information and the tunnel.

Optionally, the memory 830 stores an operating system and a program, an executable module, or a data structure, or a subset thereof, or an extended set thereof. The program may include various operation instructions used to implement various operations. The operating system may include various system programs, to implement various basic services and process hardware-based tasks. The processor 810 may read the program in the memory 830, to implement the packet transmission method according to the embodiments of the present disclosure.

The memory 830 may be a storage component in the communications device 800, or may be a storage apparatus independent of the communications device 800.

The bus system 840 may be a peripheral component interconnect (PCI) bus, an extended industry standard architecture (EISA) bus, or the like. The bus system 840 may be classified into an address bus, a data bus, a control bus, and the like. For ease of representation, only one thick line is used to represent the bus in FIG. 8, but this does not mean that there is only one bus or only one type of bus.

Figure 9:
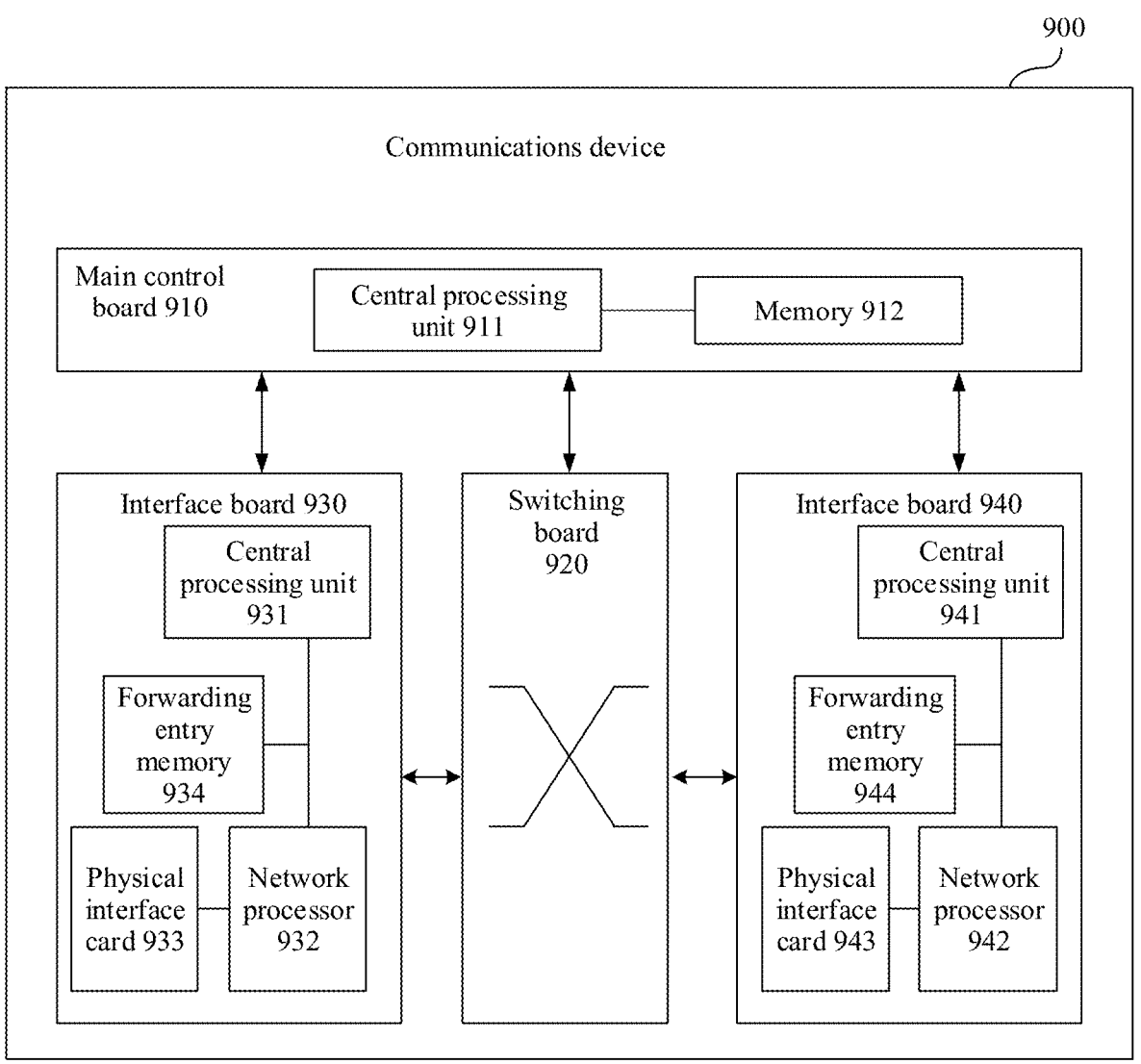
FIG. 9 is a structural diagram of another communications device according to an embodiment of the present disclosure.

FIG. 9 is a schematic diagram of a structure of another communications device 900 according to an embodiment of the present disclosure. The communications device 900 may be configured as the ingress node 201, the transit node 202, or the egress node 203 in the foregoing embodiment, or may be the first network device, the second network device, or the third network device in the foregoing embodiment, or may be device implementation of the packet transmission apparatus 700 in the embodiment shown in FIG. 7.

The communications device 900 includes a main control board 910 and an interface board 930.

The main control board 910 is also referred to as a main processing unit (MPU) or a route processing card. The main control board 910 controls and manages components in the communications device 900, including functions of route calculation, device management, device maintenance, and protocol processing. The main control board 910 includes a central processing unit 911 and a memory 912.

The interface board 930 is also referred to as a line interface unit card (LPU), a line card, or a service board. The interface board 930 is configured to provide various service interfaces, and forward a data packet. The service interface includes but is not limited to an Ethernet interface, a Packet over SONET (POS)/Synchronous Digital Hierarchy (SDH) interface, and the like. The Ethernet interface is, for example, a Flexible Ethernet (FlexE) service interface. The interface board 930 includes a central processing unit 931, a network processor 932, a forwarding entry memory 934, and a physical interface card (PIC) 933.

The central processing unit 931 on the interface board 930 is configured to control and manage the interface board 930 and communicate with the central processing unit 911 on the main control board 910.

The network processor 932 is configured to implement packet forwarding processing. A form of the network processor 932 may be a forwarding chip. In an embodiment, processing of an uplink packet includes processing of an inbound interface of the packet and forwarding table searching, and processing of a downlink packet includes forwarding table searching and the like.

The physical interface card 933 is configured to implement an interconnection function at a physical layer. Original traffic enters the interface board 930 from the physical interface card 933, and a processed packet is sent from the physical interface card 933. The physical interface card 933 includes at least one physical interface. The physical interface is also referred to as a physical port. The physical interface card 933, also referred to as a subcard, may be installed on the interface board 930, and is responsible for converting an optical/electrical signal into a packet, performing validity check on the packet, and forwarding the packet to the network processor 932 for processing. In some embodiments, the central processing unit 931 on the interface board 930 may also perform a function of the network processor 932, for example, implement software forwarding based on a general-purpose CPU. In this case, the network processor 932 is not required in the physical interface card 933.

Optionally, the communications device 900 includes a plurality of interface boards. For example, the communications device 900 further includes an interface board 940. The interface board 940 includes a central processing unit 941, a network processor 942, a forwarding entry memory 944, and a physical interface card 943.

Optionally, the communications device 900 further includes a switching board 920. The switching board 920 may also be referred to as a switch fabric unit (SFU). When the network device has the plurality of interface boards 930, the switching board 920 is configured to complete data exchange between the interface boards. For example, the interface board 930 and the interface board 940 may communicate with each other by using the switching board 920.

The main control board 910 and the interface board 930 are coupled. For example, the main control board 910, the interface board 930 and the interface board 940, and switching board 920 are connected to a system backplane through a system bus to implement interworking. In a possible implementation, an inter-process communication (IPC) channel is established between the main control board 910 and the interface board 930, and the main control board 910 and the interface board 930 communicate with each other through the IPC channel.

Logically, the communications device 900 includes a control plane and a forwarding plane. The control plane includes the main control board 910 and the central processing unit 931. The forwarding plane includes components used for forwarding, for example, the forwarding entry memory 934, the physical interface card 933, and the network processor 932. The control plane performs functions such as a function of a router, generating a forwarding table, processing signaling and protocol packets, and configuring and maintaining a status of a device. The control plane delivers the generated forwarding table to the forwarding plane. On the forwarding plane, the network processor 932 searches the forwarding table delivered by the control plane to forward a packet received by the physical interface card 933. The forwarding table delivered by the control plane may be stored in the forwarding entry memory 934. In some embodiments, the control plane and the forwarding plane may be completely separated, and are not on a same device.

If the communications device 900 is configured as the first network device, the central processing unit 911 may obtain a control item, and determine a target control item based on a device identifier of the second network device. The network processor 932 may trigger the physical interface card 933 to send a second packet including the target control item to the second network device.

If the communications device 900 is configured as the second network device, the central processing unit 911 may determine a second tunnel based on identifier information in a packet. The network processor 932 may trigger the physical interface card 933 to determine a target control item based on a determined device identifier of a third network device, and send a packet including the target control item to the third network device.

It should be understood that the sending unit 703 or the like in the packet transmission apparatus 700 may be equivalent to a physical interface card 933 or a physical interface card 943 in the communications device 900. The obtaining unit 701, the determining unit 702, and the like in the packet transmission apparatus 700 may be equivalent to the central processing unit 911 or the central processing unit 931 in the communications device 900.

It should be understood that an operation performed on the interface board 940 is consistent with an operation performed on the interface board 930 in this embodiment of the present disclosure. For brevity, details are not described. It should be understood that the communications device 900 in this embodiment may correspond to the first network device or the second network device in the foregoing method embodiments. The main control board 910, and the interface board 930 and/or the interface board 940 in the communications device 900 may implement the functions and/or the steps implemented by the first network device or the second network device in the foregoing method embodiments. For brevity, details are not described herein.

It should be understood that there may be one or more main control boards. When there are a plurality of main control boards, the main control boards may include an active main control board and a standby main control board. There may be one or more interface boards, and a network device having a stronger data processing capability provides more interface boards. There may also be one or more physical interface cards on the interface board. There may be no switching board or one or more switching boards. When there are a plurality of switching boards, load sharing and redundancy backup may be implemented by the switching boards together. In a centralized forwarding architecture, the network device may not need the switching board, and the interface board provides a function of processing service data of an entire system. In a distributed forwarding architecture, the network device may have at least one switching board, and data exchange between a plurality of interface boards is implemented by using the switching board, to provide a large-capacity data exchange and processing capability. Therefore, a data access and processing capability of a network device in the distributed architecture is better than that of a device in the centralized architecture. Optionally, the network device may alternatively be in a form in which there is only one card. To be specific, there is no switching board, and functions of the interface board and the main control board are integrated on the card. In this case, the central processing unit on the interface board and the central processing unit on the main control board may be combined into one central processing unit on the card, to perform functions obtained after the two central processing units are combined. The device in this form (for example, a network device such as a low-end switch or router) has a relatively weak data exchange and processing capability. Which architecture is specifically used depends on a specific networking deployment scenario.

In some possible embodiments, the first network device or the second network device may be implemented as a virtualized device. For example, the virtualized device may be a virtual machine (VM) on which a program having a packet sending function runs, and the virtual machine is deployed on a hardware device (for example, a physical server). The virtual machine is a complete computer system that is simulated by software, that has a complete hardware system function, and that runs in a completely isolated environment. The virtual machine may be configured as the first network device or the second network device. For example, the first network device or the second network device may be implemented based on a general-purpose physical server in combination with a network functions virtualization (NFV) technology. The first network device or the second network device is a virtual host, a virtual router, or a virtual switch. After reading the present disclosure, with reference to the NFV technology, a person skilled in the art may virtualize, on the general-purpose physical server, the first network device or the second network device having the foregoing functions. Details are not described herein.

It should be understood that the network devices in the foregoing product forms separately have any function of the first network device or the second network device in the foregoing method embodiments, and details are not described herein.

An embodiment of the present disclosure further provides a chip, including a processor and an interface circuit. The interface circuit is configured to receive instructions and transmit the instructions to the processor. The processor may be, for example, a specific implementation form of the packet transmission apparatus 700 shown in FIG. 7, and may be configured to perform the foregoing packet transmission method. The processor is coupled to a memory, the memory is configured to store programs or instructions, and when the programs or the instructions are executed by the processor, the chip system is enabled to implement the method in any one of the foregoing method embodiments.

Optionally, there may be one or more processors in the chip system. The processor may be implemented by using hardware, or may be implemented by using hardware. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may be one or more memories in the chip system. The memory may be integrated with the processor, or may be disposed separately from the processor. This is not limited in the present disclosure. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in the present disclosure.

For example, the chip system may be an FPGA, an ASIC, a system on chip (SoC), a CPU, an NP, a digital signal processor (DSP), a micro controller unit (MCU), a PLD, or another integrated chip.

An embodiment of the present disclosure further provides a computer-readable storage medium, including instructions or a computer program. When the instructions or the computer program is run on a computer, the computer is enabled to perform the packet transmission method according to the foregoing embodiments.

An embodiment of the present disclosure further provides a computer program product including instructions or a computer program. When the computer program product is run on a computer, the computer is enabled to perform the packet transmission method according to the foregoing embodiments.

It should be noted that the embodiments in this specification are described in a progressive manner, each embodiment focuses on a difference from other embodiments, and for same or similar parts in the embodiments, refer to these embodiments. The system or apparatus disclosed in the embodiments corresponds to the method disclosed in the embodiments, and therefore is briefly described. For related parts, refer to the description of the method.

It should be understood that, in the present disclosure, "at least one" means one or more, and "a plurality of" means two or more. The term "and/or" is used to describe an association relationship between associated objects, and indicates that three relationships may exist. For example, "A and/or B" may indicate the following three cases: Only A exists, only B exists, and both A and B exist, where A and B may be singular or plural. The character "/" generally indicates an "or" relationship between the associated objects. "At least one of the following items (pieces)" or a similar expression thereof indicates any combination of these items, including a single item (piece) or any combination of a plurality of items (pieces). For example, at least one of a, b, or c may indicate a, b, c, "a and b", "a and c", "b and c", or "a, b, and c", where a, b, and c may be singular or plural.

It should be noted that, in this specification, relationship terms such as first and second are only used to distinguish one entity or operation from another entity or operation, and do not necessarily require or imply that any actual relationship or sequence exists between these entities or operations. In addition, terms "include" and "have" and any variants thereof are intended to cover a non-exclusive inclusion, so that a process, a method, an article, or a device that includes a list of elements not only includes those elements but also includes other elements that are not expressly listed, or further includes elements inherent to such a process, method, article, or device. An element preceded by "includes a . . . " does not, without more constraints, preclude the presence of additional identical elements in the process, method, article, or device that includes the element.

The steps in the method or algorithm described in the embodiments disclosed in this specification may be implemented directly by hardware, software module executed by the processor, or a combination of hardware and a software module. The software module may be configured in a RAM, a memory, a ROM, an electrically programmable ROM, an electrically erasable programmable ROM, a register, a hard disk, a removable disk, a compact disc-ROM (CD-ROM), or a storage medium in any other forms well-known in the art.

The embodiments disclosed above are described to enable a person skilled in the art to implement or use the present disclosure. Various modifications to the embodiments are obvious to the person skilled in the art, and general principles defined in this specification may be implemented in other embodiments without departing from the scope of the present disclosure. Therefore, the present disclosure is not limited to the embodiments described in this specification but extends to the widest scope that complies with the principles and novelty disclosed in this specification.

What is claimed is:

1. A method implemented by a first network device which is a first route reflection device, the method comprising:
obtaining at least one first control item from at least one first packet, wherein the at least one first packet each comprises a first device identifier indicating an intended recipient of the at least one first control item, wherein the at least one first control item is a flow specification flowspec), a segment routing (SR) policy, or a route policy distribution (RPD);
determining that the first device identifier matches a second device identifier of a second network device, wherein the second device identifier is a router identifier (Router-ID);
determining, in response to the first device identifier matching the second device identifier, at least one target control item to be sent to the second network device, wherein the at least one target control item is one or more of the at least one first control item; and
sending, to the second network device, at least one Border Gateway Protocol (BGP) packet comprising the at least one target control item and the second device identifier.

2. The method of claim 1, wherein the second network device is a second route reflection device or a client device.

3. The method of claim 2, wherein when the second network device is the second route reflection device, the at least one BGP further comprises a third device identifier of a third network device for determining, from the at least one target control item based on the third device identifier, a second control item for the third network device.

4. The method of claim 1, wherein the second device identifier is separately located in an extended community attribute of the at least one BGP packet.

5. The method of claim 1, further comprising prior to obtaining the at least one first control item, receiving from the second network device, a third packet comprising the second device identifier, and wherein determining the at least one target control item comprises determining, from the at least one first packet, the at least one target control item.

6. The method of claim 1, wherein the at least one first packet is from a controller, a server, or a fourth network device.

7. The method of claim 6, wherein when the at least one first packet is from the fourth network device, and wherein the at least one first control item is based on a fourth device identifier of the first network device.

8. A first route reflection device comprising:
a memory configured to store instructions; and
a processor coupled to the memory and configured to execute the instructions to cause the first route reflection device to:
obtain at least one first control item from at least one first packet, wherein the at least one first packet each comprises a first device identifier indicating an intended recipient of the at least one first control item, wherein the at least one first control item is a flow specification (flowspec), a segment routing (SR) policy, or a route policy distribution (RPD);
determine that the first device identifier matches a second device identifier of a second network device, wherein the second device identifier is a router identifier (Router-ID);
determine, in response to the first device identifier matching the second device identifier, at least one target control item to be sent to the second network device, wherein the at least one target control item is one or more of the at least one first control item; and
send, to the second network device, at least one Border Gateway Protocol (BGP) packet comprising the target control item and the second device identifier.

9. The first route reflection device of claim 8, wherein the second network device is a second route reflection device or a client device.

10. The first route reflection device of claim 9, wherein when the second network device is the second route reflection device, the at least one BGP packet further comprises a third device identifier of a third network device for determining, from the at least one target control item based on the third device identifier, a second control item for the third network device.

11. The first route reflection device of claim 8, wherein the second device identifier is separately located in an extended community attribute of the at least one BGP packet.

12. The first route reflection device of claim 8, wherein the processor is further configured to execute the instructions to cause the first route reflection device to:
receive, from the second network device, a third packet comprising the second device identifier;
determine that the second device identifier in the third packet matches the second device identifier in the at least one first packet; and
determine, in response to the second device identifier in the third packet matching the second device identifier in the at least one first packet, the at least one target control item to be sent to the second network device from the at least one first packet.

13. The first route reflection device of claim 8, wherein the at least one first packet is obtained by the first route reflection device from a controller, a server, or a fourth network device.

14. A computer-readable storage medium, comprising instructions or a computer program, wherein when the instructions or the computer program is run on a route reflection device, the route reflection device is configured to:
obtain at least one control item from at least one first packet, wherein the at least one first packet each comprises a first device identifier indicating an intended recipient of the at least one control item, wherein the at least one control item is a flow specification (flowspec), a segment routing (SR) policy, or a route policy distribution (RPD);
determine that the first device identifier matches a second device identifier of a second network device, wherein the second device identifier is a router identifier (Router-ID);

determine, in response to the first device identifier matching the second device identifier, at least one target control item to be sent to the second network device, wherein the at least one target control item is one or more of the at least one control item; and send, to the second network device, at least one Border Gateway Protocol (BGP) packet comprising the at least one target control item and the second device identifier.

* * * * *